Aug. 2, 1938.   T. WACHS   2,125,474
POWER DEVELOPING APPARATUS AND METHOD OF OPERATING THE SAME
Filed July 11, 1936
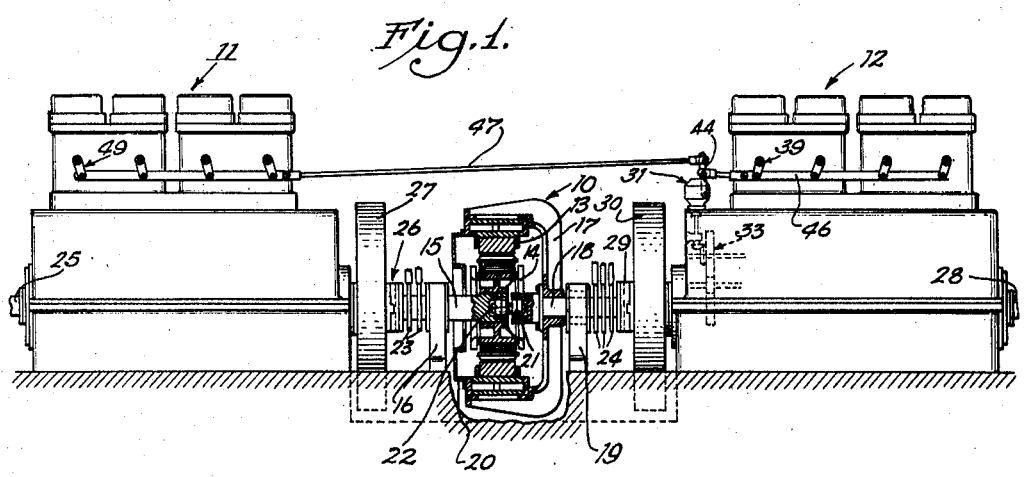
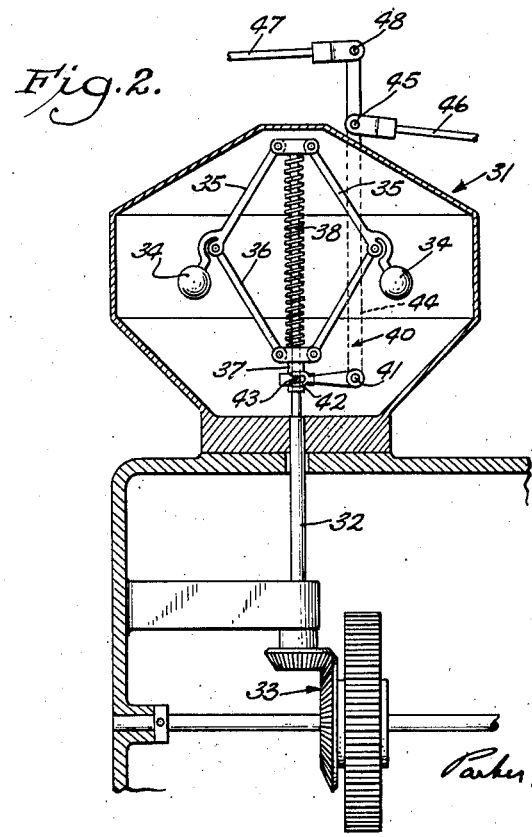
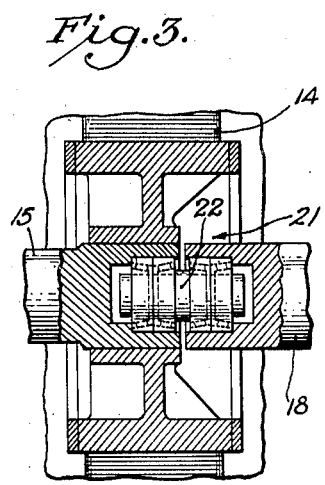
Inventor:
Theodore Wachs
By
Parker, Carlson, Pitzner & Hubbard
Attorneys.

Patented Aug. 2, 1938

2,125,474

UNITED STATES PATENT OFFICE 2,125,474

POWER DEVELOPING APPARATUS AND METHOD OF OPERATING THE SAME

Theodore Wachs, Evanston, Ill., assignor to Lucien I. Yeomans, Inc., Chicago, Ill., a corporation of Illinois Application July 11, 1936, Serial No. 90,055

8 Claims. (Cl. 290—4)

The invention relates to power developing apparatus as well as to an improved method of operating the same. More particularly, the invention relates to power developing apparatus used in various types of stationary or mobile power plant installations in which a generator of the double rotation type is utilized as a source of electrical energy.

Double rotation generators are ordinarily provided with oppositely rotatable primary and secondary members which are driven by individual prime movers. These prime movers may be in the form of internal combustion engines such as Diesel or gasoline engines or they may be reciprocating steam engines or steam turbines. Such an arrangement has several inherent advantages. First of all, the relative speed of rotation between the primary and secondary members of the generator is twice the rotative speed of one of the members alone, assuming that they each rotate at the same speed, and consequently the effective or relative speed of rotation of the generator elements is also twice the speed of the associated prime movers. Thus, in the case of an alternating current generator in which the frequency of the current delivered depends upon the relative speed of rotation of its primary and secondary members and the number of poles thereon, a current of the requisite frequency such as, for example, sixty cycles per second, may be had even though the prime movers are operated at a relatively low speed and the generator provided with a relatively small number of poles. The generator may thus be made in very compact form, even though slow speed prime movers are used. Moreover, it is frequently advantageous to operate certain types of prime movers, such as Diesel engines, at a comparatively low speed since they operate most efficiently in such a speed range. A further advantage accrues from the use of a double rotation type generator in that if a single large Diesel engine, connected to an ordinary generator, were used, for example, to deliver the same power as two smaller Diesel engines connected to a double rotation generator, extremely heavy torque loads would be imposed on the crank shaft of the single Diesel engine, thus increasing its cost of manufacture and liability to breakage. On the other hand, if two Diesel engines are mechanically connected to a single element of an ordinary generator, an expensive gearing is required.

Despite these manifest advantages in the use of double rotation generators having their primary and secondary members driven by individual prime movers, their use has heretofore been greatly limited because of the difficulties encountered in regulating or governing the speed of the prime movers. For example, in a power plant installation where the alternating current developed by a double rotation generator is to be connected to a common supply line to which current is also supplied from other sources, the frequency of the current must be carefully regulated. The frequency will, however, vary upon changes in speed of the prime movers and in the case of Diesel engines and similar prime movers, the speed does vary with changes in load when any governing apparatus heretofore available was used.

An object of the invention is to provide a power plant installation including a double rotation generator having individual prime movers for its primary and secondary members and an improved control arrangement including an ordinary speed responsive governor so arranged that a failure of the governor to effect exact regulation of the speed of one prime mover will be compensated by changes in speed of the other prime mover in such manner that the relative speed of rotation of the generator elements remains substantially constant.

A more specific object of the invention is to provide a power plant installation including a double rotation generator having individual prime movers for its primary and secondary members, a governor operative in response to variations from normal in the speed of one of the prime movers upon a change in the load imposed thereon to restore the speed of such prime mover to a speed close to its normal value but displaced a small increment therefrom in the sense of the initial variation in speed resulting from the change in load, as well as means controlled by the governor for coincidentally varying the speed of the other prime mover to cause it to operate at a speed displaced the same increment in the opposite sense from its normal speed, thereby maintaining the relative speed of rotation of the generator elements at a substantially constant value irrespective of the load imposed on the prime movers.

Another object of the invention is to provide an improved method of operating a double rotation generator installation such that the relative rotation between the members thereof will remain constant despite variations in load on the prime movers.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawing, in which:

Figure 1 is a side elevation partly in section of a power plant installation including a double rotation generator provided with individual prime movers for its primary and secondary members, and embodying the invention.

Fig. 2 is an enlarged detail view partly in section of a portion of the improved governing mechanism included in the apparatus shown in Fig. 1.

Fig. 3 is an enlarged detail view of the bearing arrangement which interconnects the ends of the generator shafts.

Referring more particularly to the drawing, the invention in its exemplary embodiment has been shown for purposes of illustration as applied to a stationary power plant installation including a double rotation generator 10 provided with individual prime movers 11 and 12, in the form of Diesel engines, for its respective primary and secondary members. It will be understood, however, that the invention also finds utility in mobile power plant installations such as are used in ships, railway trains, and the like and that, moreover, various other types of prime movers, such as gasoline engines, steam engines, and the like may be substituted for the Diesel engines illustrated.

The generator 10 includes concentrically disposed relatively rotatable primary and secondary members shown in the form of an annular field member 14 surrounded by an armature member 13. The field member 14 is carried by a shaft 15 journaled in an upstanding pedestal 16. The armature 13 is carried by a spider having radially disposed arms 17 rigidly secured to a rotatable shaft 18 which is in turn journaled in a supporting pedestal 19. The pedestals 16 and 19 are mounted on a rigid foundation or supporting base 20. The shafts 15 and 18 are disposed in alinement, their adjacent ends being loosely connected by a bearing member 21 which extends within complementary recesses formed in such adjacent ends of the shafts (Fig. 3). The bearing member 21 includes a short stub shaft 22 having relatively rotatable anti-friction bearing members on the opposite ends thereof seated within the recesses formed within the ends of the shafts 15 and 18 and thus serves to maintain the same in alinement. Current is supplied to the field member 14 through collector rings 23 while alternating current generated within the windings of armature member 13 passes therefrom through collector rings 24. The armature and field members 13 and 14 are separated by an air gap which is relatively narrow and consequently the shafts 15 and 18 must be maintained in alinement with great precision in order to prevent damage to the machine. The coupling and mounting arrangement herein disclosed is particularly effective in so safeguarding the generator.

The prime mover 11 is illustrated in the form of a four cylinder Diesel engine having a crank shaft 25 arranged substantially in alinement with the generator shaft 15. The engine 11 is also mounted on the foundation 20 but nevertheless some mis-alinement between the shafts 25 and 15 may result either from the difficulties of accurately positioning such a large and heavy piece of machinery as a Diesel engine or from settling or movement of the foundation after the installation is made. Consequently, a flexible coupling 26 is provided between the adjacent ends of the crank shaft 25 and generator shaft 15. This flexible coupling is of conventional form and includes cooperating plates having mating tongues and grooves. A fly-wheel 27 is mounted on the end portion of the crank shaft 25. The crank shaft and fly-wheel 27 are supported by the usual main bearings of the engine.

The prime mover 12 is substantially identical with the prime mover 11 described above and includes a crank shaft 28 connected in operative relation with the generator shaft 18 by a flexible coupling 29. A fly-wheel 30 is mounted on the crank shaft 28. It will thus be seen that the crank shafts of the respective engines are carried by their individual sets of supporting bearings while the rotatable members of the generator 10 are also carried by their individual supporting bearings. As a result, if the foundations or bases of the prime movers 11 and 12 shift or change position for any reason, the flexible couplings prevent alteration of the air gap between the members 13 and 14 of the generator 10 as contrasted with the case if the prime movers were rigidly connected to the generator shafts 15 and 18.

In the operation of the apparatus described above, the crank shafts 25 and 28 of the prime movers 11 and 12, respectively, are rotated in opposite directions, thus rotating the generator elements 13 and 14 in opposite directions and effecting a comparatively high speed of relative rotation therebetween. If the output of the generator 10 is to be connected to a feeder circuit or the like which is also supplied with alternating current from other generators, it is necessary that the frequency of the output current and, consequently, the relative speed of rotation of the generator elements, should remain substantially constant. The load is, however, subject to variation and in addition prime movers such as the Diesel engine illustrated are subject to change in speed upon changes in the load imposed thereon. It has heretofore been proposed to use ordinary speed responsive governors for altering the throttle setting of Diesel engines or other prime movers used in such installations so as to operate them at as nearly a constant speed as possible. In a practical installation, however, such an arrangement is not feasible because of certain inherent characteristics of all speed responsive governors now available whether they be of the centrifugal or inertia types.

In either of the types of speed responsive governors noted, the governor does not act to change the throttle setting of the engine until a change in speed has taken place. In addition, the governor does not return exactly to its original position after having effected the throttle change but does return to a position close to its original or normal position. Thus, if the governor is set so as to have a certain predetermined position when the engine or other prime mover is operating at a predetermined or normal speed for a normal rated load and the load is suddenly decreased, the engine speed will increase and the governor will operate to decrease the throttle setting, thus decreasing the engine speed so that it approaches its former normal speed. The governor does not, however, return to its normal setting but does return to an equilibrium position which is displaced a small increment in the sense of the initial variation which, in the case described, would be a speed slightly greater than the initial normal speed. Similarly, if the load on the prime mover is suddenly increased, its speed will decrease. As a result, the governor will open the throttle so as to again increase the speed of the prime mover but it will only be effective to bring the speed of the prime mover back to a value which is displaced a small increment below the previous normal speed. It will be seen that if such conventional speed responsive governors are applied to the two prime movers of a double rotation generator installation, the increments of speed variation will be additive in so far as the relative speeds of rotation of the generator elements are concerned. That is, if the two prime movers normally operate at 100 R. P. M. and the load is suddenly decreased, the governors will operate to effect subsequent operation of the prime movers at, say, 102 R. P. M. if the error in the governor is 2 per cent. In that case, the relative speed of rotation between the generator elements would be 204 R. P. M. after the operation of the governors as compared to its previous normal value of 200 R. P. M. Such operation would obviously result in so wide a variation in output frequency for the generator as to render the apparatus impractical.

In accordance with the present invention, an improved method and apparatus therefor is provided for minimizing the effects of the fault in the conventional type of governor set forth in so far as it affects the relative angular velocity of the two generator elements, independently of speed variations in the prime movers themselves. In general, the apparatus includes a conventional speed responsive governor for one of the prime movers, which operates with the usual lack of precision noted above, and in addition means cooperating therewith for maintaining the speed of the other prime mover at such a value as to compensate for variations from normal speed of the first prime mover. As a result, the sum of the individual speeds of rotation of the prime movers is maintained substantially constant irrespective of the variations in the individual speed of one of the prime movers due to the imperfect regulating action of its governor.

In the particular apparatus illustrated, the engine 12 is provided with a conventional centrifugal type governor mechanism indicated generally by the numeral 31. This governor mechanism includes a shaft 32 driven in synchronism with the engine crank shaft 28 by a suitable gear connection 33. A pair of radially disposed weights 34 are carried by links 35 pivotally connected to the upper end of the shaft 32. These links 35 are pivotally connected intermediate their ends by links 36 to a collar 37, which is axially slidable on the shaft 32. Upon rotation of the shaft 32, the weights or masses 34 tend to move outwardly due to centrifugal force, thus moving the collar 37 upwardly on the shaft 32. This upward force exerted on the collar 37 is, however, resisted by a compression spring 38 surrounding the shaft 32 and bearing against the collar. The spring 38 is adjusted with respect to the weights 34 so that the collar 37 will occupy some predetermined position on the shaft 32 when the latter is rotated at a predetermined normal speed.

The collar 37 of the governor 31 is connected to a throttle mechanism indicated generally by the numeral 39 for the engine 12 by a suitable linkage. In the arrangement illustrated, a bell crank lever 40 is mounted on a fixed pivot 41 and a forked end 42 on one arm of the bell crank lever engages a pin 43 on the collar 37. The vertical arm 44 of the bell crank lever 40 is pivotally connected at 45 to a link 46 which is in turn operatively connected to the throttle mechanism of the engine 12. It will be understood that the throttle mechanism may be of any desired type for regulating the flow of displacement fluid to the engine. Its particular construction will depend upon the type of engine used. Thus, in the case of a steam engine, the throttle mechanism may operate to vary the pressure of the steam admitted to the cylinders of the engine while in the case of a Diesel engine the throttle mechanism may regulate a suitable injection pump.

In view of the foregoing, it will be seen that if an increase in load is suddenly imposed on the generator 10, the speed of the engine 12 will be momentarily decreased. As a result, the centrifugal force exerted on the weights 34 of the governor mechanism 31 will also be decreased so that the collar 37 moves downwardly, thus shifting the link 46 to the left, as viewed in the drawing. As a result, more fuel will be admitted to the cylinders of the engine 12 so that its power output is increased and its speed likewise increased. Upon such increase in speed, the weights 34 will again tend to move outwardly and the governor will finally reach a point of equilibrium at a speed slightly less than the previous normal operating speed. In such case, the member 14 of the generator 10 will be rotated at a speed slightly less than its previous normal speed of rotation.

In order to compensate for the decrease in speed of the generator member 14 described above, an arrangement has been provided to vary the speed of the engine 11 in the opposite sense from its normal rated value. In the construction illustrated, this arrangement includes a pantograph linkage which in general serves to exaggerate the movement of the governor collar 37. As a result, the throttle setting of the second prime mover is changed in the same sense as that of the first prime mover but to a greater extent or exaggerated degree. This pantograph linkage includes a horizontal link 47 connected to the upper end of the bell crank lever arm 44 by a pivot 48. It will thus be seen that for a given movement of the bell crank lever arm 44 about its pivot 41, the link 47 will be moved a relatively greater distance than the link 46 due to the greater displacement of the pivot 48 from the pivot 41 as compared to the pivot 45. Thus, in the case of an increased load described above and consequent incremental decrease in the speed of the engine 12, the throttle mechanism 49 of the engine 11 will be opened a greater amount than the throttle mechanism 39 of the engine 12 and, consequently, the engine 11 will be operated at a somewhat greater speed than the engine 12. The linkage or operating connection between the governor 31 and the throttle mechanism 49 of the engine 11 is so arranged that the engine 11 will be operated at a speed just sufficiently greater than that of the engine 12 to compensate for the variation of the latter from its normal value. That is, in the case of an increase in load on the generator 10, such that the speed of the engine 12 falls to a value of, say, two per cent below its normal operating speed, the speed of the engine 11 will be increased to a value two per cent above its normal operating speed. As a result, the relative speed of rotation between the elements 13 and 14 of the generator 10 will remain constant.

It will be apparent that the same action in a reverse sense will take place upon a decrease in the load on the generator 10. Thus, if the load is decreased on the generator 10 and, consequently, on the engine 12, the speed of the latter will momentarily increase. Such an increase in speed will cause the governor mechanism 31 to decrease the throttle setting of the throttle mechanism 39 so that the engine 12 finally attains a steady state of operation at a speed slightly above its normal operating speed. This resultant speed may be, say, two per cent greater than the normal operating speed. At the same time, the governor mechanism 21 also operates to close the throttle mechanism 49 of engine 11 but this closing movement is exaggerated by the linkage described so that the engine 11 is slowed down an even greater amount. The resultant speed of the engine 11 is thus less than its initial normal operating speed. The operative connection to the throttle mechanism 49 is such that the increment below normal of the speed of engine 11 is equal to the increment above normal of engine 12. In such case, the relative speed of rotation of the generator elements 13 and 14 remains constant.

It will thus be seen that when a double rotation generator installation is operated in accordance with the invention, the relative speed of rotation of the generator elements remains substantially constant even though the speed of rotation of the individual prime movers varies due to inherent deficiencies in the operating characteristics of the governing mechanism associated with one of the prime movers. It will also be seen that the apparatus which has been illustrated for carrying out this improved method is simple in construction and, in general, embodies a combination of conventional machine elements which are readily available.

Although a particular embodiment of the invention and its application has been described with particularity for purposes of illustration, it should be understood that there is no intention to thereby limit the invention to the particular embodiment and application described but, on the other hand, the appended claims are intended to cover all modifications within the spirit and scope of the invention.

I claim as my invention:

1. In a power plant installation, the combination of, a double rotation generator having oppositely rotatable primary and secondary members, individual prime movers for said generator members, said prime movers being oppositely rotatable, governor means operative in response to a variation from normal in the speed of one of said prime movers upon a change in the load imposed thereon to restore the speed of said one prime mover to a speed close to its normal value but displaced a small increment therefrom in the sense of the initial variation in speed resulting from the change in load, and means controlled by said governor means for coincidentally varying the speed of the other prime mover to cause it to operate at a speed displaced the same increment in the opposite sense from its normal speed, thereby maintaining the relative speed of rotation of said generator primary and secondary members at a substantially constant value irrespective of the load imposed on said prime movers.

2. In a power plant installation, the combination of, a double rotation generator having oppositely rotatable primary and secondary members, individual prime movers for said generator members, said prime movers being oppositely rotatable, governor means for maintaining the speed of one of said prime movers close to its normal value with changes in load thereon, and means controlling the speed of the other of said prime movers to compensate for variations from normal speed of said one prime mover, thereby maintaining the relative speed of rotation of said generator primary and secondary members at a substantially constant value irrespective of the load imposed on said prime movers.

3. In a power plant installation, the combination of, a double rotation generator having oppositely rotatable primary and secondary members, individual prime movers for said generator members, said prime movers being oppositely rotatable, individual throttle mechanisms for each of said prime movers, a centrifugal type governor responsive to changes in speed of one of said prime movers for varying the throttle setting thereof to maintain the speed of said one prime mover close to its normal value with changes in load thereon, and means controlled by said governor for coincidentally varying the throttle setting of the other prime mover to cause it to operate at a speed displaced from its normal speed an amount equal to but opposite in sense to any displacement from its normal speed of said one prime mover, thereby maintaining the relative speed of rotation of said generator primary and secondary members at a substantially constant value irrespective of the load imposed on said prime movers.

4. In a power plant installation, the combination of, a double rotation generator having oppositely rotatable primary and secondary members, individual prime movers for said generator members, said prime movers being oppositely rotatable, individual throttle mechanisms for each of said prime movers, a centrifugal type governor responsive to changes in speed of one of said prime movers for varying the throttle setting thereof to maintain the speed of said one prime mover close to its normal value with changes in load thereon, and means including a pantograph linkage operatively connected to said governor and to the other of said throttle mechanisms for coincidentally varying the setting of said other throttle mechanism to cause said other prime mover to operate at a speed displaced from its normal speed an amount equal to but opposite in sense to any displacement from its normal speed of said one prime mover, thereby maintaining the relative speed of rotation of said generator primary and secondary members at a substantially constant value irrespective of the load imposed on said prime movers.

5. In a power-plant installation, the combination of two oppositely rotatable prime movers, a double rotation generator having primary and secondary members operatively connected to said prime movers, a governor mechanism for varying the flow of displacement fluid supplied to one of said prime movers in response to variations in speed thereof, and means operatively connecting said governor mechanism to the second prime mover for varying the flow of displacement fluid supplied thereto in an exaggerated degree with respect to the variations in speed of said one prime mover.

6. The method of operating a double rotation generator provided with oppositely rotatable primary and secondary members driven by individual variable speed prime movers. which comprises, maintaining the speed of one of the prime movers close to its normal speed with changes in load thereon, and varying the speed of the other of the prime movers to compensate for variations from normal speed of said one prime mover.

7. The method of operating a double rotation generator provided with oppositely rotatable primary and secondary members driven by individual variable speed prime movers, which comprises, returning the speed of one of the prime movers to a value close to its normal value after a change in load but to a value displaced therefrom an increment in the sense of an initial variation caused by the change in load, and varying the speed of the other prime mover by the same increment but in the opposite sense from its normal value.

8. The method of operating a double rotation generator provided with oppositely rotatable primary and secondary members driven by individual variable speed prime movers, which comprises, varying the flow of displacement fluid supplied to one of the prime movers in inverse proportion to variations in speed thereof upon changes in load, and simultaneously varying the flow of displacement fluid supplied to the other prime mover in the same sense but in an exaggerated degree.

THEODORE WACHS.